United States Patent Office 2,812,175
Patented Nov. 5, 1957

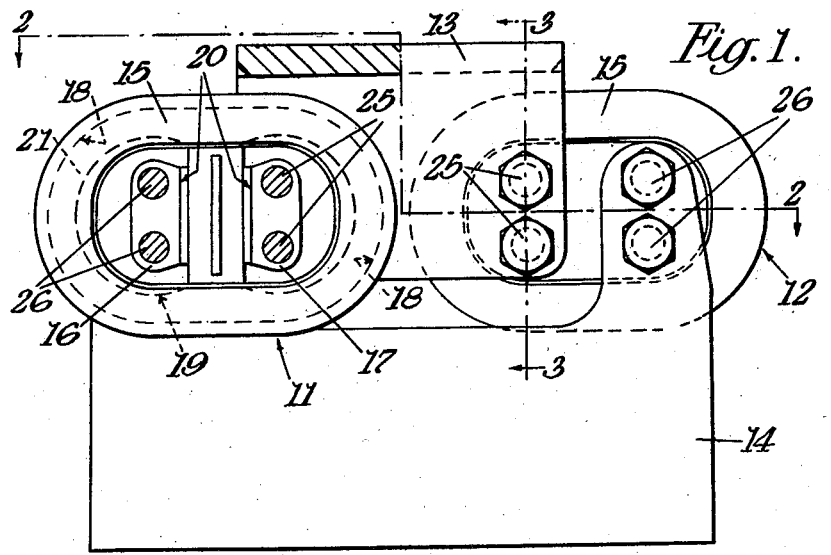
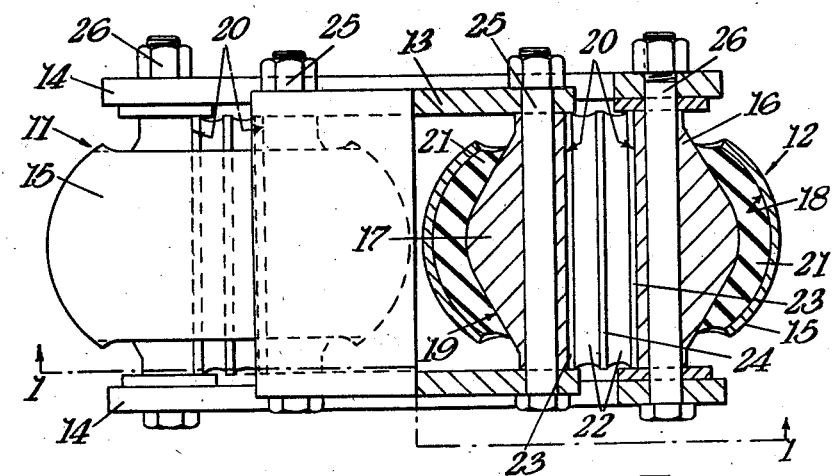
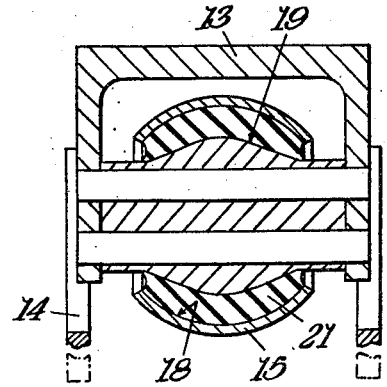

2,812,175
RESILIENT MOUNTINGS
Archie John Hirst, Leicester, England, assignor to Metalastik Limited, Leicester, England, a corporation of Great Britain Application May 3, 1954, Serial No. 427,003

6 Claims. (Cl. 267—63)

This invention relates to resilient mounting links and to resilient mounting assemblies utilising one or more of such links. By a resilient mounting link is meant a device having a pair of attachment elements adapted to be secured to two respective parts so that one part while imposing a load on the other part is permitted a limited movement relative thereto. Thus a vehicle engine may have to be mounted upon the chassis, or a coach may have to be mounted upon a bogie, so as to be resiliently supported by said chassis or bogie; again in a torque transmission coupling, a driving element may be coupled to a driven element in a manner permitting a limited degree of angular vibration between the two.

It is one of the possible advantages of the invention that it makes it possible to provide a resilient mounting link or a resilient mounting assembly which is capable of carrying very heavy loads with good flexibility, yet it is very compact.

The following description relates to the accompanying drawings which show, by way of example only, an embodiment of the invention made use of in the mounting of a marine engine. In the drawings:

Figure 1 is an elevational view of the mounting, partly in section on the line 1—1 of Figure 2;

Figure 2 is a plan view of the mounting, partly in section on the line 2—2 of Figure 1; and Figure 3 is a transverse section on the line 3—3 of Figure 1.

As shown in the drawing a pair of links 11 and 12 arranged toggle-wise form a mounting between a bracket 13 bolted to one of the engine mounting flanges not shown and a bracket 14 bolted to one of the ship's bearer beams not shown. The engine crankshaft lies parallel to the plane of the section shown in Figure 3.

Each of the links 11 and 12 consists of an encasing elongated loop-like metal element 15 and two similar metal attachment elements 16 and 17 located within the encasing element 15 towards the ends thereof so that there is a space between them in the waist of the encasing element. The encasing element 15 has its rounded end portions formed so that the internal surfaces 18 are part-spherical or substantially so; and the outer surfaces 19 of the attachment elements 16 and 17 are similarly shaped so that the space between these two surfaces when filled as will be described is of substantially uniform depth. The rear surfaces 20 of the attachment elements 16 and 17 are planar and when the space between them is filled as will be described are parallel or substantially so.

The spaces between the juxtaposed part-spherical surfaces 18 and 19 respectively of the encasing element 15 and the attachment elements 16 and 17 are filled with rubber 21.

The space between the juxtaposed planar surfaces 20 of the attachment elements 16 and 17 is filled with rubber 22. This rubber filling 22 is in the form of a rubber sandwich, the rubber itself being bonded to metal end plates 23 and being separated into two layers by a metal interleaf 24, thereby increasing the stiffness of the rubber sandwich to compression loads applied to the end plates 23.

In the assembly of the pair of links 11 and 12 toggle-wise to form a mounting, the inner attachment elements 17 of the two links are secured each by two bolts 25 to the inverted channel-shaped bracket 13 which is in turn bolted to the engine mounting flange. Similarly the outer attachment elements 16 are secured each by two bolts 26 to the channel-shaped bracket 14 bolted to one of the ship's bearer beams. By this provision of two bolts for each attachment element, it is ensured that the movement of the bracket 13 relative to the bracket 14 is rectilinear.

The parts of the toggle assembly are in the straight-line position as shown when subjected to normal loading: upon the occurrence of shock or rebound in either sense they will of course be displaced momentarily from that straight-line position.

In the manufacture of the individual link 11 or 12, the dimensioning of the parts is such that the rubber sandwich 22 is in a state of precompression normally to the juxtaposed planar surfaces 20 of the elements 16 and 17 and the rubber filling 21 is in a state of precompression normally to the surfaces 19 and 18 of the attachment elements 16 and 17 and the encasing element 15 respectively. There is no attachment between the end plates 23 of the rubber sandwich and the attachment elements 16 and 17; consequently even though, as here, the assembly of the link puts the link into a state of super-added tension, either as a normal condition or as a result of transient shock, it is never possible for the rubber of the outer layer 21 to be put into a state of tension. The rubber filling 21 between the attachment members 16 and 17 and the encasing element 15 is bonded to these components and extends not only around the ends but also across the waist of the link, an opening for the rubber sandwich 22 being formed by a removable core in moulding. By this continuation of the rubber layer 21 across the waist between the two attachment elements 16 and 17, the usual limitation of the capacity of bushes having part-annular rubber elements is avoided. The attachment elements 16 and 17 have equal angular movements on deflection of the mounting so that the portion of the rubber 21 along the waist of the link though distorted is not subjected to any significant loading.

The flat surfaces 20 of the attachment elements 16, 17 remain parallel and equidistant on deflection of the link and so stress the rubber sandwich 22 between them in shear. In the free state the flat surfaces 20 are inclined to the normal to the link axis so that when assembled and placed under static load they become, as shown in Figure 1, perpendicular to the longitudinal axis of the link. When the parts are being assembled, there being then no load and the bracket 13 standing higher in relation to bracket 14 than is shown in Figure 1, the bolts 25 and 26 can be freely inserted into their respective holes, there being no change of the spacing between members 16 and 17 as between the free and laden conditions.

It will be understood that the resilient link 16 or 17 may take other forms than that shown in the accompanying drawings, and that other arrangements are possible of one or more links, whether as shown or in some modified form. Then the form of the individual link may differ in that the inner surface 18 of the ends of the encasing element 15 may be semi-cylindrical and the adjacent portions 19 of the attachment elements 16, 17 of complementary form, leaving a part-tubular space between for the rubber filling 21. However, the part-spherical form may be preferable as affording a high degree of strength and rigidity. Both the substantially cylindical and the substantially spherical are hereinafter referred to generally as "arcuate." Again, instead of opposed links assembled under initial compression a single link may be employed with a rubber sandwich stressed in shear or normal deflection and aranged to apply the initial compression in the mean position.

In such a link designed and mounted as described with reference to the drawings, the initial longitudinal compression of the link is borne mainly by compressive stress of the rubber filling between the link attachment members. The release of the initial compression of the rubber 21 during deflection from the free position to the normal laden position reduces the stiffness due to torsional loading of the rubber filling 21 between the attachment members and the other element. For larger deflection beyond the point at which the whole of the initial compression has been restored the link is extended by compression of the rubber filling 21 adding considerably to the stiffness due to the torsional loading of the same part of the rubber filling. Thus the mounting shows an S-shaped load/deflection characteristic, and achieves this not only by increased resistance to movement on large deflections but by reduced stiffness over a limited range of movement under small deflections.

By rubber is meant not only natural rubber, but any of the artificial materials having similar characteristics to natural rubber.

I claim:

1. A resilient mounting link comprising an encasing element, a pair of attachment elements disposed in spaced parallel relationship within the encasing element and having their juxtaposed surfaces contained in spaced parallel planes to define a space therebetween, at least a part of the remainder of the surface of each of said detachment elements being part spherical and spaced equi-distantly from the adjacent internal surface of the encasing element to define arcuate spaces between said adjacent internal surface and the part-spherical portion of the attachment elements, a rubber filling within said arcuate spaces and a rubber filling within the space between said juxtaposed surfaces, the rubber filling between said juxtaposed surfaces being in a state of pre-compression normal to said surfaces.

2. A resilient mounting link comprising an encasing element, a pair of attachment elements disposed in spaced parallel relationship within the encasing element and having their juxtaposed surfaces contained in spaced parallel planes to define a space therebetween, at least a part of the remainder of the surfaces of said attachment elements being shaped similarly to the adjacent internal surface of said encasing element to define part-spherical arcuate spaces between said adjacent internal surface and said part of the surfaces of said attachment elements, a rubber filling within said arcuate spaces and a sandwich element filling said space between said juxtaposed surfaces, said sandwich element being in a state of precompression normal to said juxtaposed surfaces and being composed of two outer plates abutting said juxtaposed surfaces, a third plate disposed between and substantially parallel to said two outer plates and a rubber filling between said two outer plates and said third plate.

3. A resilient mounting comprising an elongated loop-like metal encasing element having rounded end portions, two similar metal attachment elements located within said encasing element in spaced parallel relationship, the juxtaposed surfaces of said attachment elements being contained in spaced parallel planes to define a space therebetween and at least a part of the remainder of the surfaces of said attachment elements being spaced equidistantly from the adjacent internal surfaces of said rounded end portions to define part-spherical arcuate spaces between said internal surfaces and said part of the surfaces of said attachment elements, a rubber filling within said arcuate spaces which is pre-compressed normal to said internal surfaces, two outer plates abutting against said juxtaposed surfaces, a third plate disposed between and substantially parallel to said two outer plates and a rubber filling bonded at least to said two outer plates and filling the space between the latter and said third plate.

4. A resilient mounting comprising an encasing element having rounded end portions the internal surfaces of which end portions are part-spehrical, and a waist portion joining said end portions, two similar metal attachment elements located within said encasing element in spaced parallel relationship and associated one with each end portion the juxtaposed surfaces of said attachment elements being contained in spaced parallel planes to define a space therebetween and at least a part of the remainder of the surfaces of said attachment elements being part-spherical and spaced equidistantly from the adjacent internal surface of the associated end portion to define an arcuate space between each of said internal surfaces and the part-spherical surface of the associated attachment element, a rubber filling within said arcuate spaces precompressed in a direction normal to said internal surfaces, two outer plates abutting against said juxtaposed surfaces, a third plate disposed between and substantially parallel to said two outer plates and a rubber filling between said two outer plates and said third plate and precompressed in a direction normal to said juxtaposed surfaces.

5. A resilient mounting comprising an encasing element having rounded end portions, the internal surfaces of which end portions are part-spherical with their axes disposed parallel to each other, a waist portion joining said end portions, two similar metal attachment elements located within said encasing element in spaced parallel relationship and associated one with each end portion, the juxtaposed surfaces of said attachment elements being contained in spaced parallel planes to define a space therebetween and at least a part of the remainder of the surfaces of said attachment elements being part-spherical and spaced equidistantly from the adjacent internal surface of the associated end portion to define an arcuate space between each of said internal surfaces and the part-spherical surface of the associated attachment element, a rubber filling within said arcuate spaces precompressed in a direction normal to said internal surfaces, two outer plates abutting against said juxtaposed surfaces, a third plate disposed between and substantially parallel to said two outer plates and a rubber filling between said two outer plates and said third plate and precompressed in a direction normal to said juxtaposed surfaces.

6. A resilient mounting comprising an elongated loop-like metal encasing element having rounded end portions, two similar metal attachment elements located within said encasing element in spaced parallel relationship and associated one with each of said end portions to define an arcuate space between each internal surface of the latter and the adjacent external surface of the associated attachment element, the juxtaposed surfaces of said attachment elements being contained in spaced parallel planes to define a space therebetween, a rubber filling within said arcuate spaces precompressed in a direction normal to the associated internal surface, two outer plates abutting against said juxtaposed surfaces, a third plate disposed between and substantially parallel to said two outer plates, a rubber filling between said two outer plates and said third plate and precompressed in a direction normal to said juxtaposed surfaces, two parts relatively moveable in a direction substantially parallel to said parallel planes, two bolts extending through one of said attachment elements and secured to one of said parts and two bolts extending through the other of said attachment elements and secured to the other of said parts.

References Cited in the file of this patent

UNITED STATES PATENTS

| | | |
|---|---|---|
| 2,043,011 | Schjolin | June 2, 1936 |
| 2,063,758 | Schjolin | Dec. 8, 1936 |
| 2,270,673 | Lord | Jan. 20, 1942 |
| 2,467,721 | Avila | Apr. 19, 1949 |
| 2,541,566 | Applegate | Feb. 13, 1951 |

FOREIGN PATENTS

| | | |
|---|---|---|
| 968,283 | France | Apr. 12, 1950 |